April 21, 1925.

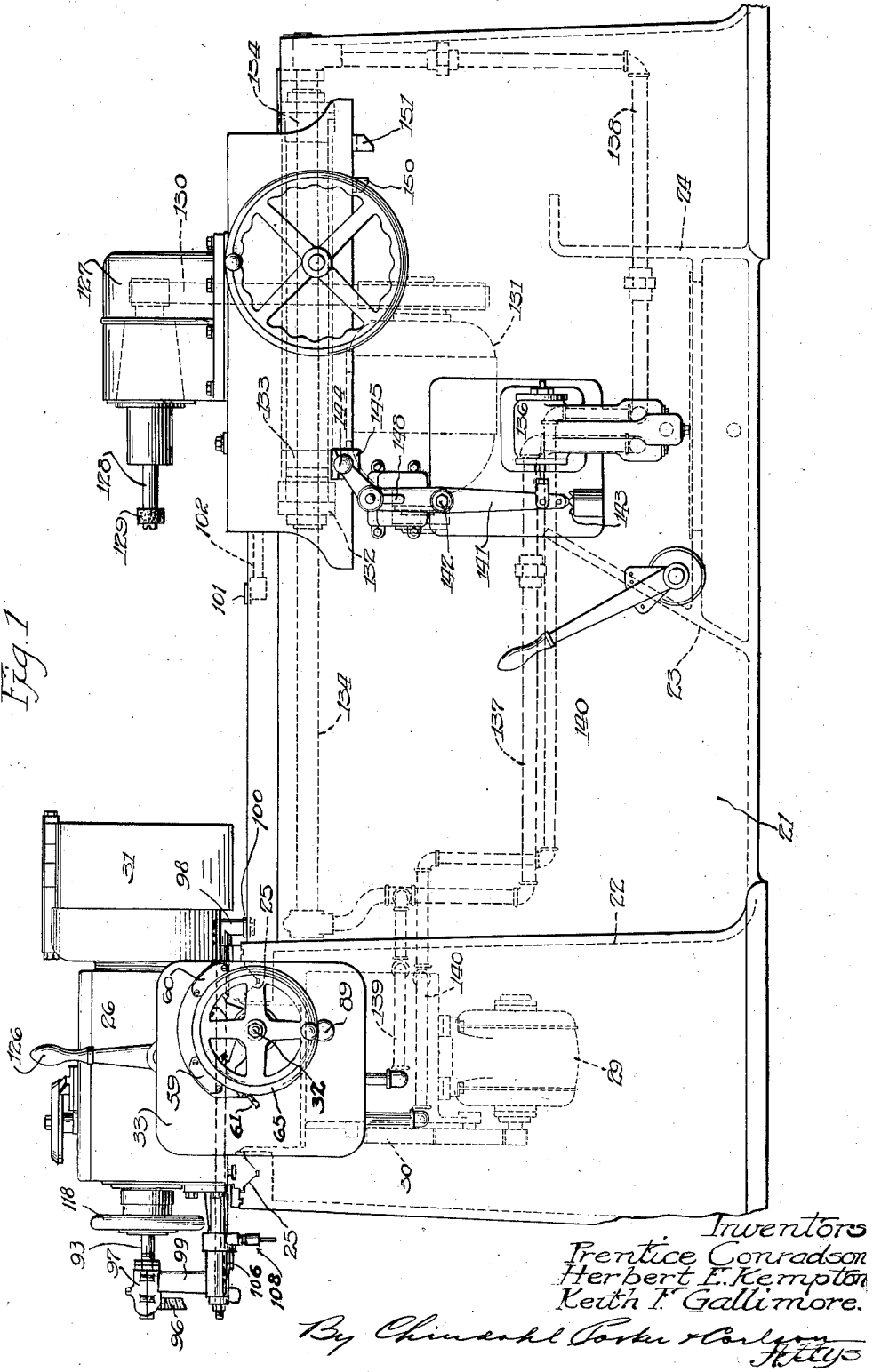

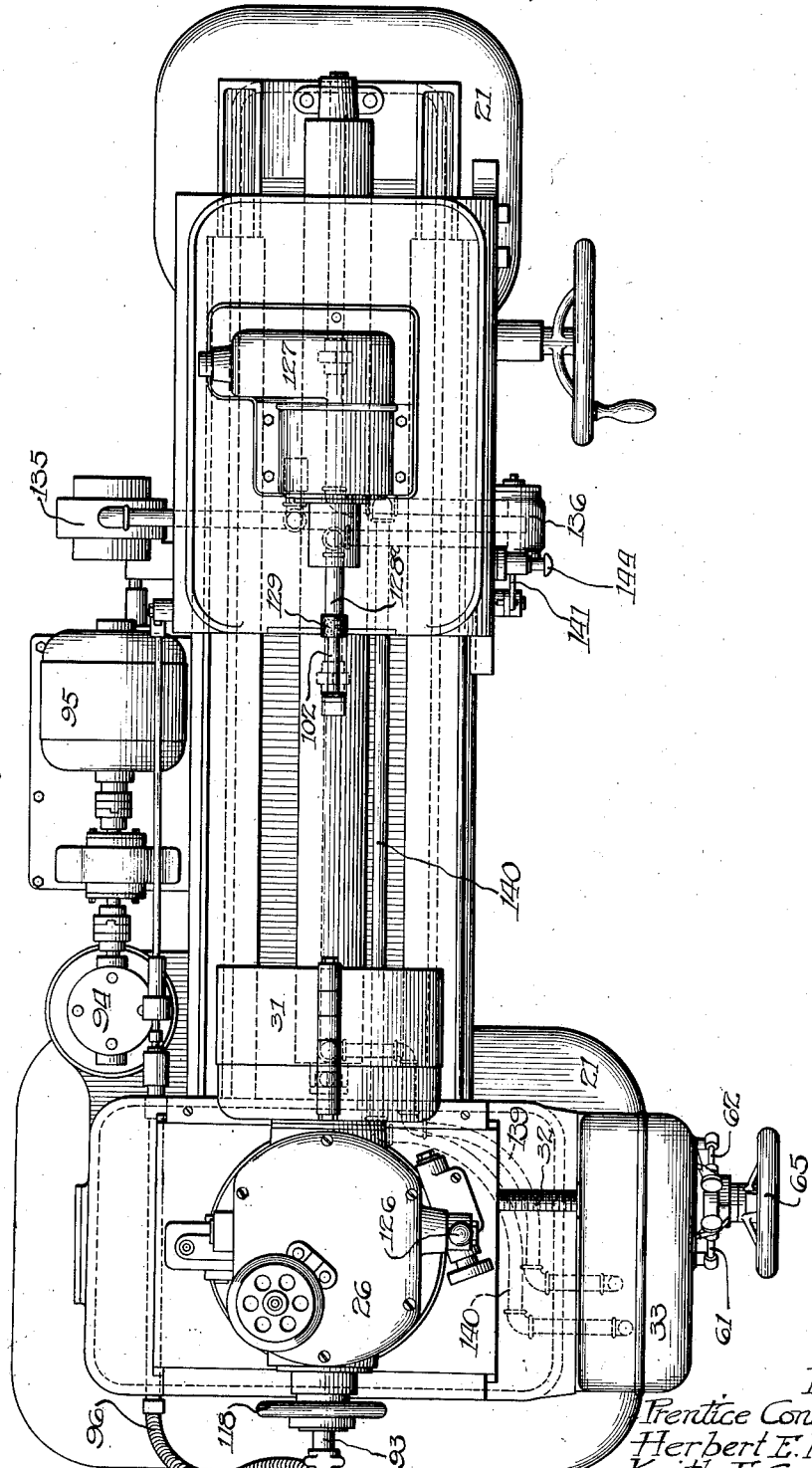

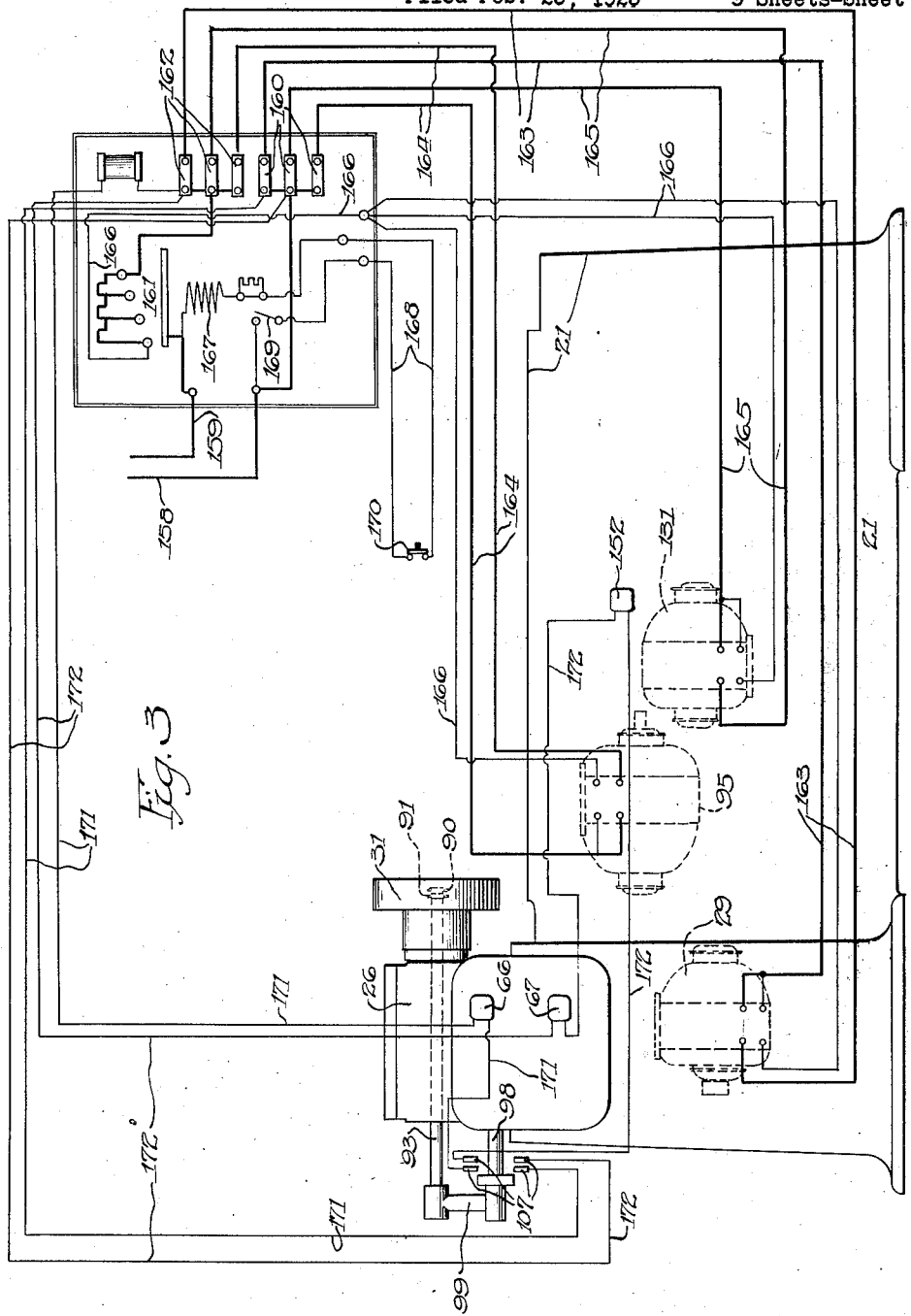

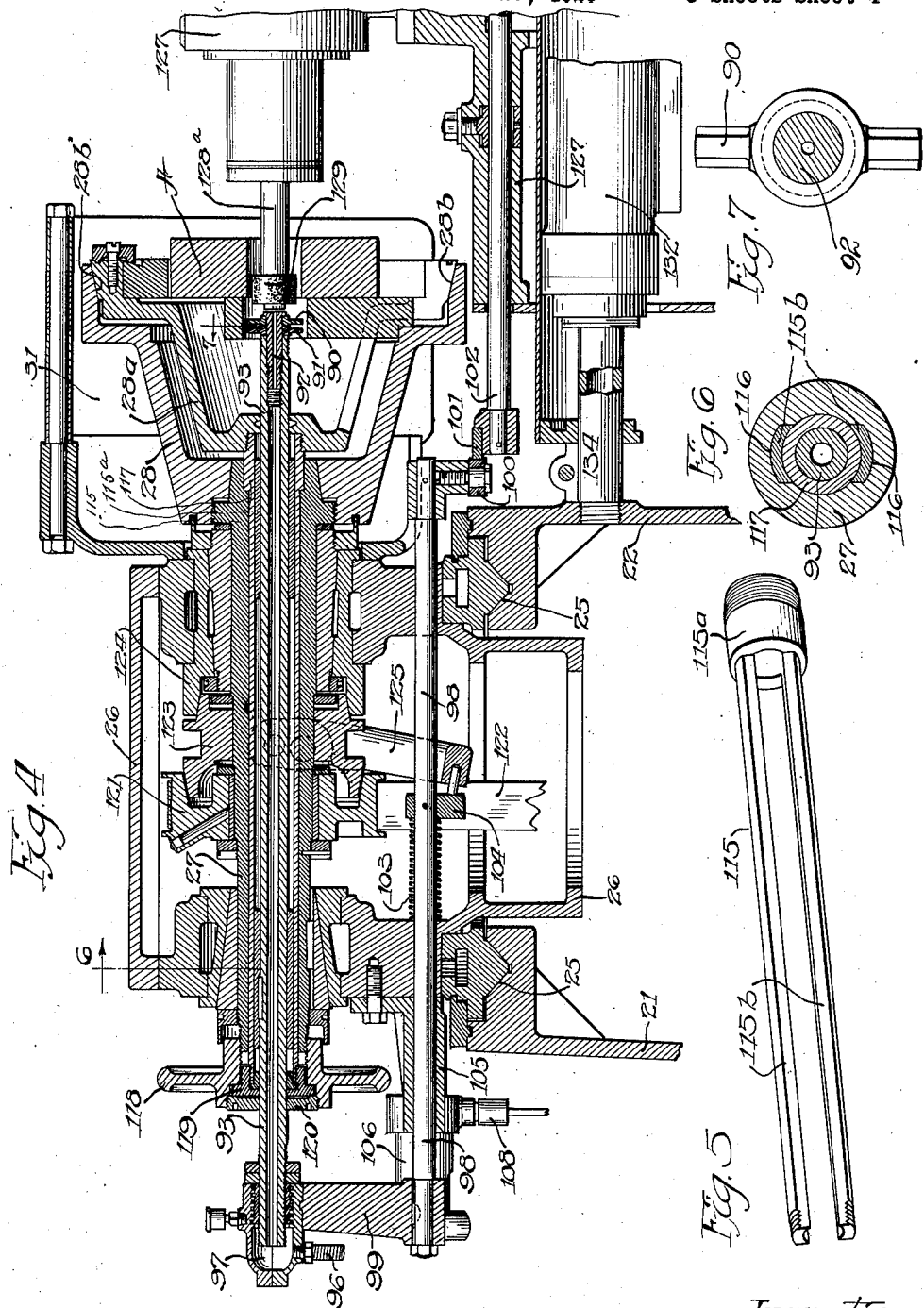

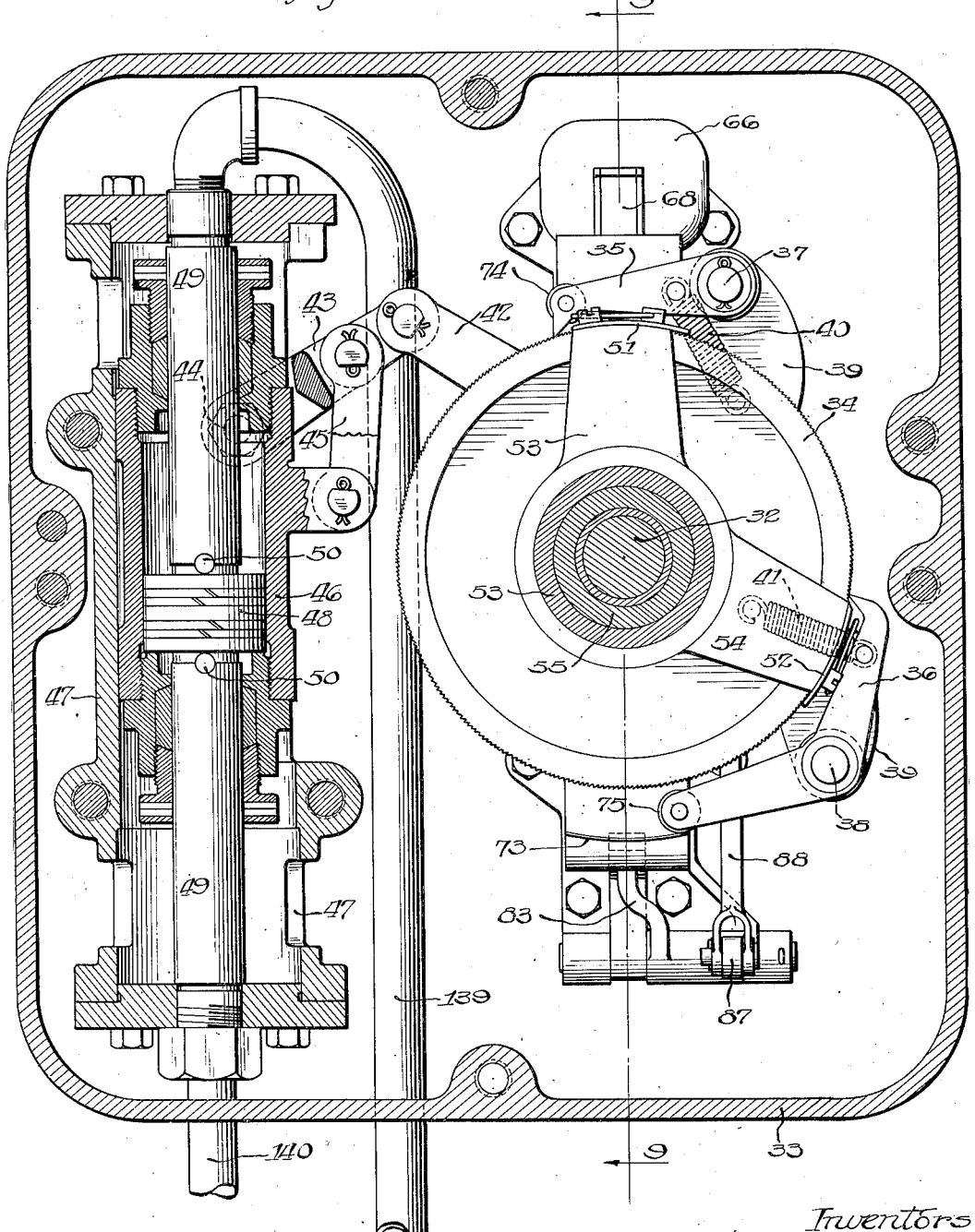

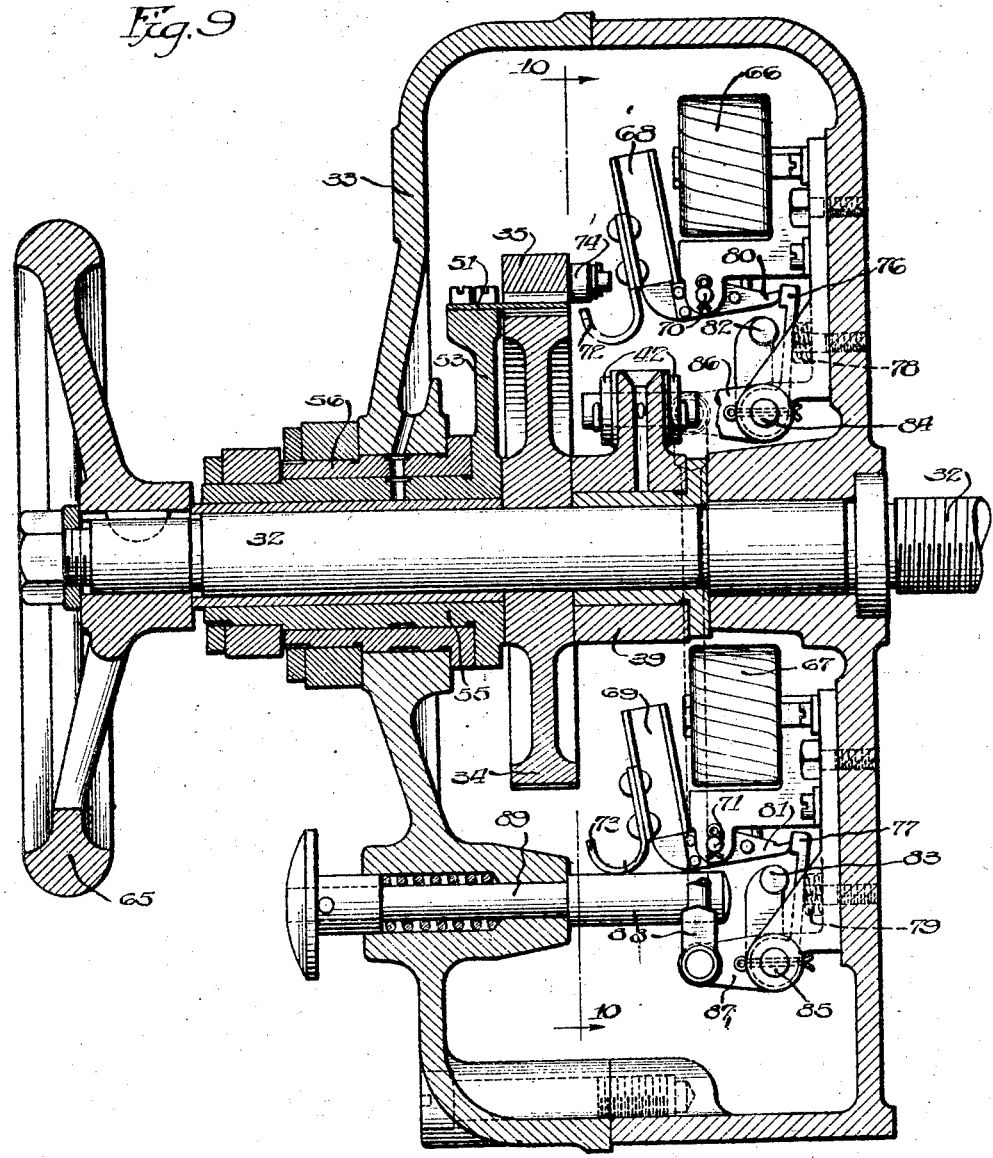

P. CONRADSON ET AL 1,534,302

GRINDING MACHINE

Filed Feb. 23, 1923    9 Sheets-Sheet 7

Inventors
Prentice Conradson.
Herbert E Kempton
Keith F Gallimore

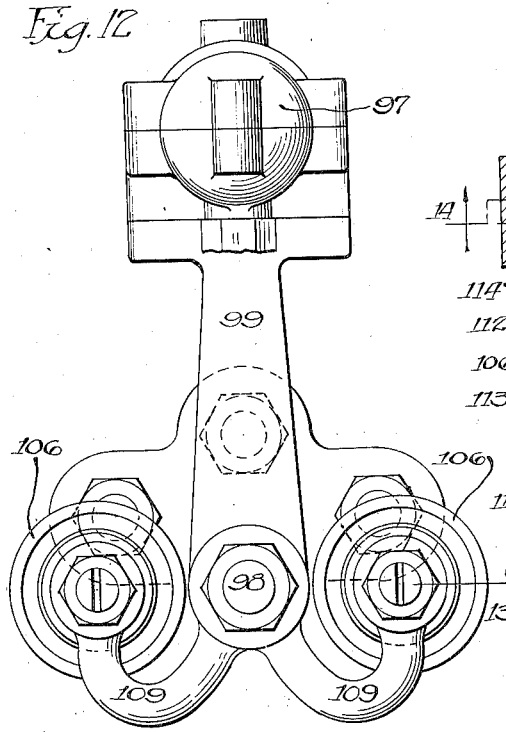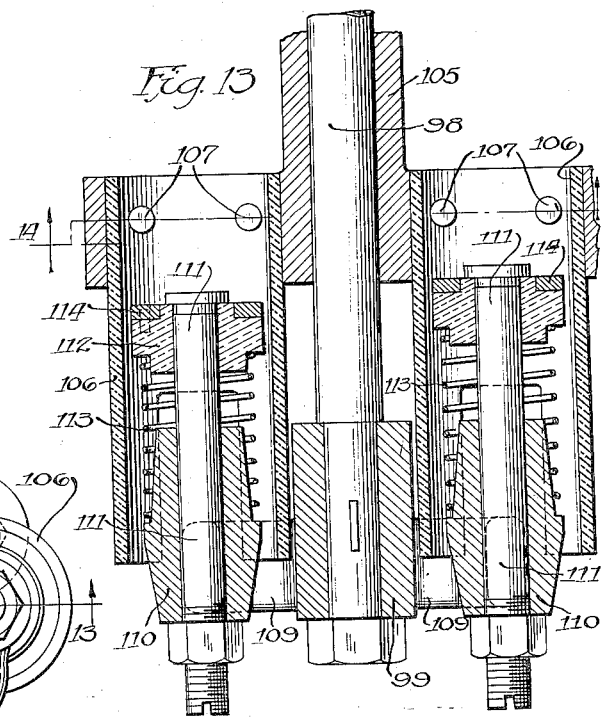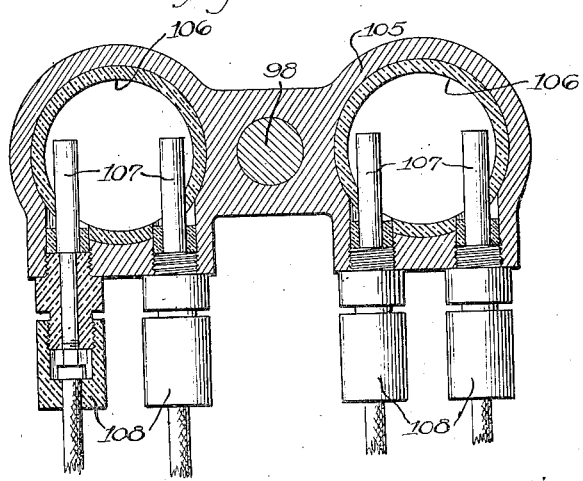

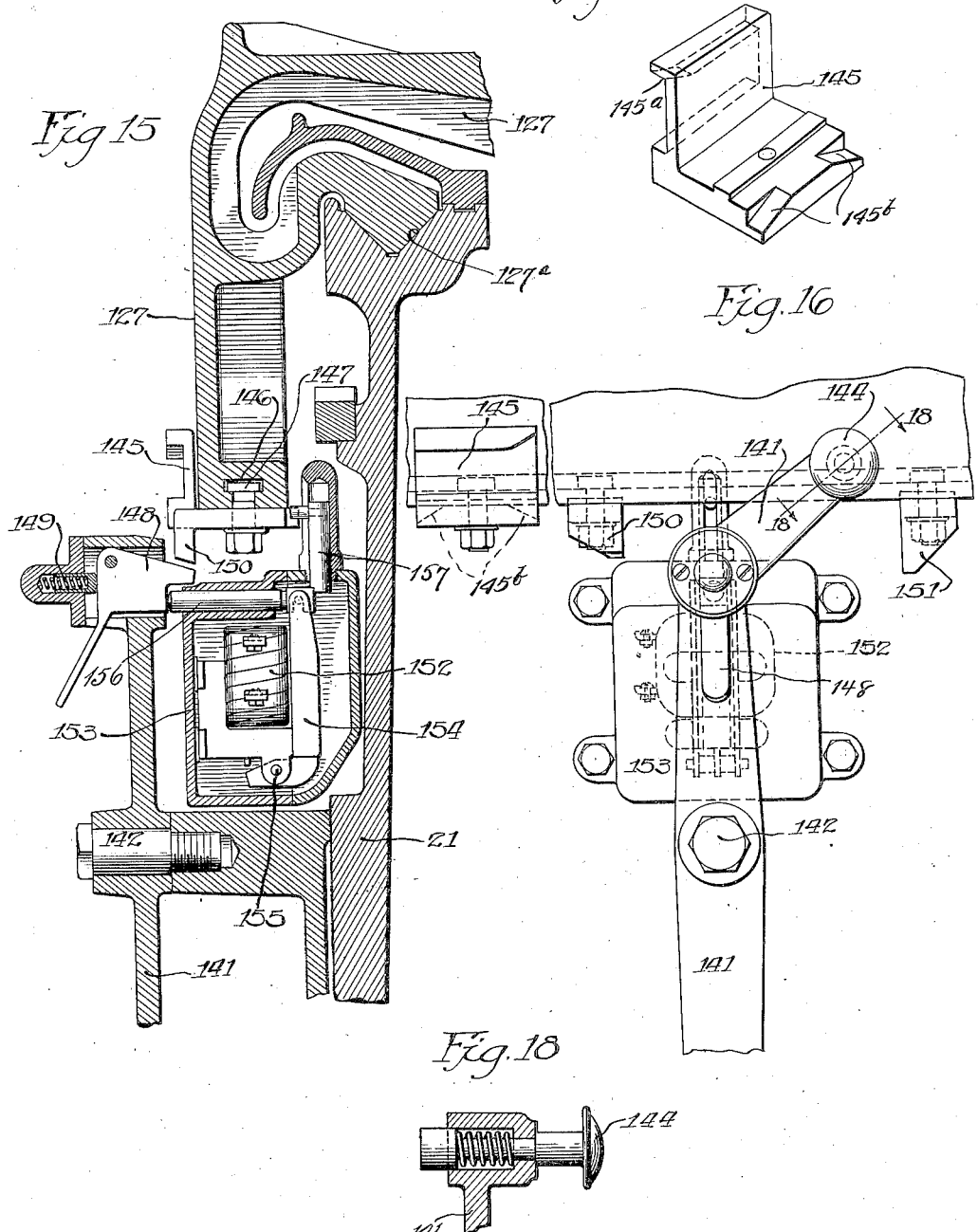

Patented Apr. 21, 1925.

1,534,302

UNITED STATES PATENT OFFICE.

PRENTICE CONRADSON, OF EVANSVILLE, AND HERBERT E. KEMPTON AND KEITH F. GALLIMORE, OF FOND DU LAC, WISCONSIN, ASSIGNORS TO GIDDINGS & LEWIS MACHINE TOOL COMPANY, OF FOND DU LAC, WISCONSIN, A CORPORATION OF WISCONSIN.

GRINDING MACHINE.

Application filed February 23, 1923. Serial No. 620,604.

*To all whom it may concern:*

Be it known that we, PRENTICE CONRADSON, a citizen of the United States, residing at Evansville, in the county of Rock and State of Wisconsin, and HERBERT E. KEMPTON and KEITH F. GALLIMORE, citizens of the United States, residing at Fond du Lac, in the county of Fond du Lac and State of Wisconsin, have invented a certain new and useful Grinding Machine, of which the following is a specification.

This invention relates to a grinding machine of a novel type and although applicable to machines for various classes of grinding, the invention is herein shown as embodied in a machine which is particularly intended for internal work, that is, for grinding the bores of bushings, gears and various other parts.

A general object of the invention is to produce a new high speed grinder which operates automatically and by which internal grinding may be done with great speed and accuracy.

It is one of the primary objects of our invention to produce a machine which has a grinding wheel carriage and a work spindle carriage arranged to move in horizontal planes transverse to each other, and which has means to automatically gage the size of the bore, and hydraulic or pressure-fluid-operated means controlled by said gaging means and arranged to automatically advance the grinding wheel carriage from its idle to its operative or grinding position and reciprocate the said carriage in the latter position, and to return the carriage to and stop it at its idle position, when the gage enters the bore in the work.

Another object of the invention is to provide automatic gaging means which comprises a coarse gage and fine gage, to provide a novel mechanism to feed the work spindle carriage comprising a coarse feed which operates until the coarse gage pin enters the bore and a fine feed which then automatically comes into play and continues until the fine gage pin enters the bore, and to provide improved means for controlling the action of said feeds.

A further object is to provide a novel construction and arrangement of parts which are coaxially associated with the work spindle, including a gage rod and coolant conduit, and a novel chuck operating means.

Another object is to provide novel means for reciprocating the gage rod to withdraw the gage pins out of the way of the grinding wheel in the reciprocations of the latter.

A further object is to provide novel means for withdrawing the gage pins and holding them out of engagement with the work when the chuck is being loaded and unloaded.

Another object is concerned with the electric devices and circuits by which the various parts of the machine are automatically operated in harmony and synchronism.

Further and ancillary objects of the invention and attendant advantages thereof will be more fully understood from the following detailed description taken in connection with the accompanying drawings, in which Fig. 1 is a front side elevation of a grinding machine embodying our invention in its preferred form.

Fig. 2 is a top plan view of the machine.

Fig. 3 is a diagrammatic representation of the machine and the electric circuits and controlling devices thereof.

Fig. 4 is a vertical section through the headstock or work spindle carriage along the axis of the spindle.

Fig. 5 is a perspective view of the chuck operating bar.

Fig. 6 is a cross section through the work spindle and associated parts, taken in the plane of line 6 of Fig. 4.

Fig. 7 is a cross section through the work gage.

Fig. 8 is a vertical sectional view illustrating the headstock carriage feed mechanism.

Fig. 9 is a vertical section in the plane of line 9—9 of Fig. 8.

Fig. 12 is an elevational view taken from the left hand end of Fig. 1 illustrating the control switches of the gaging means.

Fig. 13 is a horizontal section in the plane of line 13 of Fig. 12.

Fig. 14 is a vertical section in the plane of line 14 of Fig. 13.

Fig. 15 is a fragmental vertical section through a part of the machine base and a part of the grinding wheel carriage, illustrating the electrical control means for governing the movements of the grinding wheel carriage.

Fig. 16 is a fragmental elevation of the parts seen in Fig. 15.

Fig. 17 is a perspective view of a cam block which is mounted on the grinding wheel carriage.

Fig. 18 is a sectional detail view of a detent in the main control lever.

Figure 10:
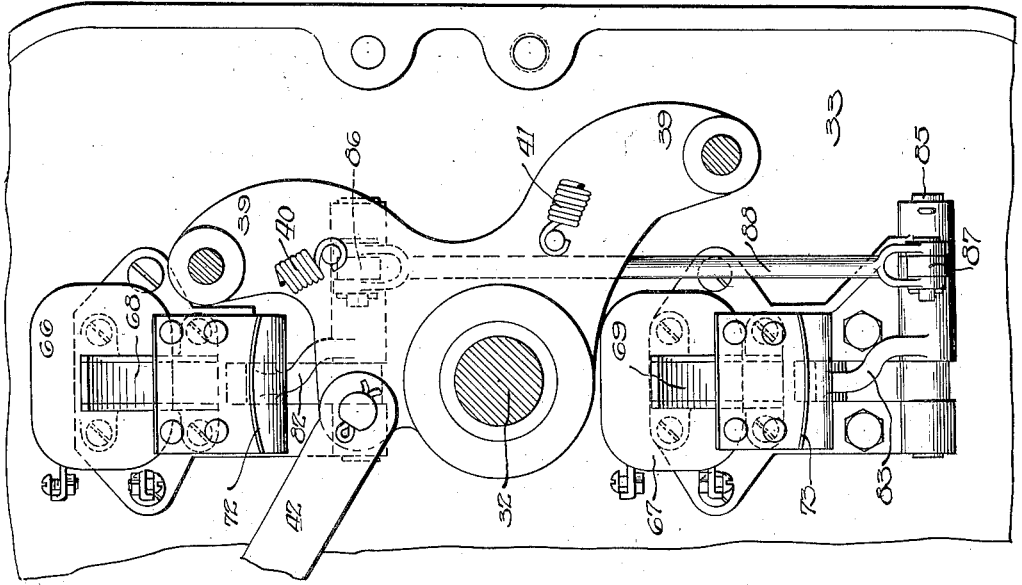
Fig. 10 is a vertical section in the plane of line 10—10 of Fig. 9 showing in elevation a portion of the headstock carriage feed mechanism.

While various features of our invention are applicable to other types of grinding machines, we have herein disclosed the invention as embodied in an internal grinder and will describe in detail this preferred embodiment. It should be understood, however, that this disclosure is given for the purpose of imparting an understanding of our invention and not with any intention of limiting the invention to the exact construction disclosed. We aim to cover in the subjoined claims all modifications and equivalents falling within the scope of the invention as limited by the state of the prior art.

*Brief description of machine as a whole.*

A brief explanation of the general construction and operation of the machine will facilitate an understanding of the more detailed description to follow.

The machine comprises a hollow base casting on one end of which is mounted a headstock carriage to slide transversely of the base. This carriage has a spindle provided with a chuck or fixture for holding the work to be ground, and a motor and gearing for driving said spindle is mounted on the underside of the carriage to travel therewith (see dotted lines in Fig. 1). A transverse feed screw engages this carriage, and in a feed box (best seen at the lower left hand corner of Fig. 2) is arranged a pawl and ratchet mechanism (Fig. 8) for intermittently rotating said feed screw, also a piston and cylinder forming part of the hydraulic operating mechanism for actuating this pawl and ratchet mechanism. The said pawl and ratchet mechanism provides a coarse and a fine feed.

On the opposite end of the machine base is mounted a grinding wheel carriage to slide longitudinally of the base from an idle position, as seen in Fig. 1, to an operative position in which the grinding wheel enters the bore of the work carried by the spindle of the headstock carriage, as shown in Fig. 4. A piston and cylinder unit is provided for moving the grinding wheel carriage, the cylinder being mounted on and traveling with said carriage, while the piston is stationary. The spindle of this carriage is driven by an electric motor which is also mounted on the underside of the carriage to travel therewith.

The two operating cylinders for the carriages are connected by suitable pipes through a main control valve to a pump which draws its supply of actuating fluid, preferably oil, from a reservoir within the base, to which reservoir the spent oil is returned. This main control valve is actuated by an upright lever, best seen in Fig. 1, the upper end of which is arranged to be engaged by stops or dogs on the grinding spindle carriage to control the position of the lever and thereby the movable valve member. In the idle position of the grinding spindle carriage, seen in Fig. 1, this lever is in its neutral position so that no oil is being forced into either of the cylinders.

When the operator wishes to start the machine after having secured a piece of work to its spindle in the headstock, he releases and swings the lever to cause oil to be forced into the grinding-wheel-carriage cylinder, also into the actuating cylinder for feeding the headstock carriage, thereby advancing the grinding wheel carriage to its operative position in which the grinding wheel enters the bore of the work and also starting the feeding mechanism for the headstock carriage. The latter carriage may be manually advanced until the grinding wheel begins to take its cut.

In the operating position of the grinding wheel carriage the two dogs which project from the lower right hand end of the carriage (Fig. 1) are caused alternately to engage a projection on the right control lever and swing said lever back and forth automatically to reverse the main control valve and cause the oil under presure to be forced alternately into the opposite ends of the two cylinders.

Two gage pins, one a coarse gage and the other a fine gage, are mounted on the end of a rod which passes axially through the headstock spindle, said rod being reciprocable through suitable connections with the grinding wheel carriage so that the gage pins attempt to enter the bore of the work on each reciprocation of the grinding wheel. This gage rod controls certain electric circuits and devices by which the operation of the machine is governed. When the bore of the work has reached a predetermined size, the coarse gage pin will enter the bore and a circuit will thereby be closed to change the feed mechanism for the headstock carriage from the coarse feed to the fine feed. When the fine gage pin enters the bore the following will occur: The feed mechanism will be stopped, the main control lever for the hydraulic operating mechanism will be automatically tripped to cause the grinding wheel carriage to be moved from its operative or grinding position to the idle position seen in Fig. 1 in which idle position the hydraulic control lever will be caught and moved to neutral position so that the reciprocation of both cylinders of the hydraulic operating mechanism will be stopped.

The operator now removes the finished piece of work and mounts another piece in the chuck or fixture whereupon he again starts the cycle of operations just described to advance the grinding wheel carriage into operative position and to start the headstock feed mechanism.

Referring now more particularly to the specific construction of the present embodiment of the invention, the machine comprises a hollow base casting 21, having an internal transverse wall 22 which separates the main portion of the base from the wider portion upon which the headstock carriage is mounted. Between the wall 22 and another transverse wall 23 is a chamber which contains the coolant fluid which is sprayed upon the work being ground, and between the wall 23 and a third transverse wall 24 is a reservoir which contains the oil constituting the hydraulic actuating fluid for the two carriage-operating cylinders.

The headstock carriage per se forms the subject matter of a copending application Ser. No. 619,123; the grinding spindle carriage per se is described and claimed in a copending application Ser. No. 619,124; while the hydraulic operating mechanism and other features are covered in application Ser. No. 619,122; all of which applications were filed on February 15, 1923, by Prentice Conradson.

*The headstock carriage and feeding mechanism.*

Referring to Fig. 4, the base 21 has a pair of ways 25 extending transversely of the machine, upon which ways the headstock carriage 26 is slidably mounted. As fully disclosed in the copending applications above referred to, this carriage has a rotary spindle 27 which carries at one end a suitable chuck or fixture 28 for holding the work to be ground, the spindle being driven by an electric motor 29 through suitable connections including change speed gearing 30. The motor and driving connections are mounted upon the underside of the carriage 26 to travel therewith. 31 designates a hood which encloses the work-holding chuck or fixture.

The carriage is arranged to be fed along the ways 25 by a feed screw 32 (Figs. 2 and 9) mounted on the base and engaging in a part on the carriage 26. The outer end of the feed-screw shaft 32 extends through a so-called feed box 33, and within said box a ratchet wheel 34 is fixed on the feed screw and is intermittently rotated by small degrees by means of either one of two pawls 35 or 36 pivoted at 37 and 38 respectively upon a double-arm rocker 39, the pawls being drawn toward the ratchet wheel 34 by springs 40 and 41. The said rocker 39 is mounted upon the axis of the ratchet wheel and is connected to an actuator which in this instance consists of the moving element of a piston and cylinder unit. The connecting means comprises a pair of toggle links 42 and 43 having their remote ends connected respectively to the rocker 39 and to a fixed pivot 44, the link 43 being connected between its ends by a link 45 to a stud projecting from the cylinder 46 which, in this instance, is a reciprocating element. This cylinder is mounted to slide in a suitable guide housing 47. A stationary piston 48 within the cylinder is held in place by oppositely extending rods 49 which are tubular and which have transverse bores 50 at their inner ends through which pressure fluid is introduced into the cylinder and escapes therefrom. The ends of the rods 49 are stationarily supported in the ends of the guide housing 47.

In each reciprocation of the cylinder 46 both pawls 35 and 36 will be moved forward and back to impart intermittent partial rotation to the feed screw 32. In this way both pawls are given a constant length of reciprocation but means is provided for accomplishing a differential effect of the two pawls upon the ratchet wheel so that one pawl provides a coarse feed and the other a fine feed, also for varying the rate of feed of either pawl in its operative effect upon the ratchet wheel. This means in the form herein shown comprises a pair of arcuate shields 51 and 52 interposed between the ratchet wheel and the respective pawls, said shields being mounted upon arms 53, 54 carried by hubs 55 and 56 which fit one within the other and are mounted upon the feed-screw shaft 32 to rotate independently.

Figure 11:
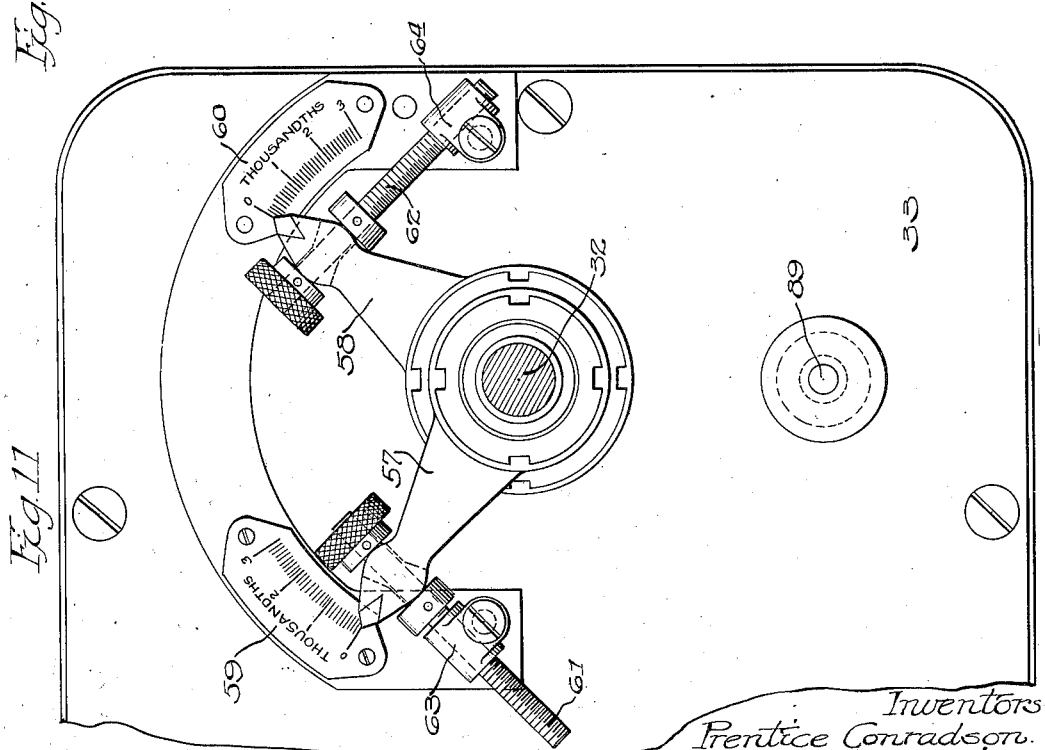
Fig. 11 is a front elevation of part of the means for varying the rate of feed of the headstock carriage.

Upon the outer ends of these hubs are fixed arms 57 and 58 (Fig. 11) having pointers at their ends to cooperate with scales 59, 60, fixed upon the outer face of the feed box. Screws 61 and 62 which are threaded in stationary nuts 63, 64 pass through openings in the arms 57, 58, each arm lying between the knurled head of its screw and a collar fixed on the screw, so that by turning the screw the arm may be swung to rotate its hub 55 or 56 and vary the position of its shield 51 or 52 in respect of the adjacent pawl. The pawls in their reciprocation slide idly over these shields for part of their stroke and in the active stroke run off the edges of the shields and move into engagement with the teeth of the ratchet wheel. The shields are so positioned that one of the pawls runs off its shield before the other to effect a greater degree of rotation of the ratchet wheel and provide a coarse feed while the other pawl provides a fine feed. The degree of feed of either pawl may be regulated at pleasure by turning the appropriate screw 61 or 62.

As has heretofore been stated, in the general description of the machine, mechanism is provided for rendering inoperative the coarse feed pawl when the coarse gage pin enters the bore of the work being ground, and also for rendering inoperative the fine feed pawl when the fine gage pin enters such bore so as to stop the feed of the headstock carriage. When both pawls are inoperative the carriage may be moved manually in either direction by means of a hand wheel 65 fixed on the end of the feed screw shaft. The said mechanism, in the preferred form herein shown, is electromagnetic in character and comprises a pair of magnet coils 66 and 67 (Fig. 9) stationarily mounted on suitable brackets in the feed box 33 and co-operating armatures 68 and 69 pivoted at 70 and 71 respectively to said brackets, said armatures carrying tracks 72 and 73 which underlie rollers 74 and 75 on the respective pawls, said tracks being preferably curved concentrically with the ratchet wheel 35.

As each of these electromagnets is energized caused by the closing of the circuit when a gage pin enters the bore of the work, the armature of the magnet is swung to move its pawl out of position to engage the ratchet wheel, the roller 74 or 75 then running back and forth on the track 72 or 73 in the continued reciprocation of the pawl.

In order that the headstock carriage may be free to be moved manually in either direction by the hand wheel 65 when both pawls have been disengaged and the feed stopped, means is provided for automatically locking the magnet armatures in their held-out position and for manually releasing the armatures to permit the return of the pawls to operative position. In the exemplary form herein shown, this means comprises dogs 76 and 77 which are normally urged by springs 78 and 79 into a position to engage the angular extensions 80 and 81 on the armatures 68 and 69 as best seen in Fig. 9. When the armatures are attracted by the magnets the dogs move in position to overlie the ends of these extensions and hold them in such position.

The means for disengaging the dogs 76, 77, comprises arms 82 and 83 pivoted on shafts 84 and 85 and having parts in position to strike said dogs, the shafts 84, 85 also having arms 86 and 87 which are connected by an upright link 88 so as to move together. A spring-pressed plunger 89 mounted in the wall of the feed box 33 is so positioned that when the operator pushes on the outer end of the plunger, the inner end will engage the arm 83 and cause this arm and the corresponding upper arm 82 to move both dogs 76 and 77 out of engagement with the armatures, so that the pawls 35 and 36 will be restored to operative position.

Referring now to the means for gaging the work to be ground, which is best seen in Fig. 4, a piece of work "A" is shown as mounted in the chuck 28 concentrically with the spindle 27. The gages 90 and 91 (Fig. 7) are, in the present instance, in the form of two hubs each having two pins projecting diametrically in opposite directions therefrom, the hubs being mounted upon a headed fitting 92 which is tapped into the end of a gage rod 93 that passes axially through the spindle 27. The gages are thus mounted concentric with the spindle and the work chuck. The pins of the first or coarse gage 90 are slightly shorter than those of the fine gage 91, so that the coarse gage may enter the bore some time before the fine gage can enter.

The gage rod 93 is preferably tubular and the fitting 92 has an axial passage therethrough so that these parts serve not only as a means of supporting the gages but also as means for conducting coolant through the spindle to be played upon the grinding wheel or the piece of work or both. The coolant circulating means is fully disclosed in application Ser. 619,122 hereinbefore referred to. Briefly, this means may comprise a suitable circulating pump 94 (Fig. 2) driven by a motor 95, the pump drawing coolant from the storage chamber provided between the walls 22 and 23 within the machine base, and the coolant being forced from the pump through a flexible conduit 96 into a hollow fitting 97 which encloses the outer end of the tubular gage rod 93.

Means is provided for reciprocating the gage rod 93 in synchronism with the reciprocations of the grinding wheel in the bore of the piece of work, so that at each reciprocation the gage pins attempt to enter the bore but are moved out of the way of the grinding wheel. This reciprocating means preferably comprises a rod 98 which extends parallel with and beneath the gage rod 93 being mounted in suitable bearings in the headstock carriage. A bracket 99 rigidly connects the outer ends of the rod 98 and the gage rod 93, so that the two rods reciprocate in unison. The inner end of the rod 98 has fixed thereon a roller stud 100 which is arranged to be engaged by a wear plate 101 on the end of a push-rod 102 that is fixed in and projects from the grinding wheel carriage. A coiled spring 103 surrounds the rod 98, bearing at one end against a collar 104 fixed on the rod and at its other end against a part on the carriage 26, said spring tending to slide the rod 98 inwardly and thereby move the gage pins toward the piece of work "A." In each reciprocation of the grinding wheel carriage the push-rod 102 on said carriage will move the gage pins out of the way of the grinding wheel, and the spring 103 will cause the gage pins to be moved into contact with the piece of work, and, when the bore has been ground to size, will cause the gage pins to enter the bore.

It has already been stated that the entry of the coarse gage pin into the bore of the work would cause the closure of the electric circuit to effect a withdrawal of the coarse feed pawl 35 from the ratchet wheel 34 and the entry of the fine gage (which is of slightly greater dimensions) into the work would similarly cause closure of the electric circuit to withdraw the fine feed pawl 36 from its ratchet wheel and completely stop the feed of the carriage. The preferred means for accomplishing this result comprises a pair of switches, one element of each of which is mounted to reciprocate with the gage-operating rod 98 and the other elements of which are stationary. One form of switch device which may be used for this purpose is illustrated in Figs. 12 to 14, wherein it will be seen that a stationary bracket 105 through which the rod 98 reciprocates, carries a pair of insulating tubes 106 into each of which projects a pair of contact pins 107 arranged to be bridged by the moving switch element to be presently described. Each of these contact pins is suitably insulated from the bracket 105 by means of insulating fittings 108 mounted in the bracket, through which fittings the pins pass. The bracket 99 has a pair of arms 109 on its lower end which are provided with bearings 110 and in each of these bearings is slidably mounted a pin 111 carrying on its inner end a collar 112 of insulating material. A coiled compression spring 113 surrounds each pin, bearing at its opposite ends against the collar 112 and the bearing 110 and tends to move the pin 111 and collar 112 inwardly toward the spaced contact pins 107. Each collar 112 carries a conducting ring 114 which is in position to engage a pair of the pins 107 and close an electric circuit between said pins. One of the collars 112 is normally closer to its pair of contact pins 107 than is the other collar so that the former will engage its pins first, and this pair of pins is connected in the circuit which includes the magnet 66 for the coarse feed pawl 35 as will be later explained in connection with the wiring diagram. The other pair of pins is similarly connected to the magnet 67 for the fine feed pawl 36. When the coarse gage 90 enters the work, one pair of contact pins 107 will be bridged to cause the coarse feed pawl 70 to be withdrawn and when the fine gage enters the work, the other pair of pins 107 will be bridged to effect a withdrawal of the fine feed pawl. In the reciprocation of the gage rod 93 when the coarse gage fails to enter the bore of the work, the collars 112 will be held away from the contact pins 107. When the gages enter the bore the springs 113 permit the collars 112 and pins 111 to yield.

In addition to the combined gage rod and coolant tube 93, the spindle 27 has means passing therethrough for operating the work chuck 28. In order to incorporate all of these devices in the small compass necessary in practice, the said parts are constructed and related in a special and novel manner as will be presently described. The chuck which is herein shown by way of example is of the well-known collet type and comprises the outer section 28 which is mounted directly on the end of the spindle 27 and the inner section 28$^a$ which is slotted at a plurality of points to form yielding jaws, said outer and inner sections having beveled or conical cooperating faces 28$^b$ by means of which the jaws on the inner section are caused to clamp or release the piece of work "A" when the inner section is moved in an axial direction with relation to the outer section.

The novel means herein provided for moving the inner chuck section axially comprises a draw bar 115 (Fig. 5) which preferably has a sleeve 115$^a$ at one end fitting within the end of the spindle 27 and suitably connected to said inner chuck section, either by threading the said sleeve exteriorly upon a projecting hub on the chuck section or by engaging the exteriorly threaded end of the sleeve in a socket in the chuck section, the latter method being shown by way of example in the drawings. The remainder of said draw bar comprises two bars 115$^b$ extending from diametrically opposite points on the sleeve 115$^a$ and fitting within channels 116 (Fig. 6) formed in the interior of the spindle 23. Bushings 117 which are fixed upon the gage rod 93 fit slidably within the spindle and serve accurately to center the said gage rod in the spindle. Said rod and the two parts 115$^b$ of the draw bar are thus mounted for independent sliding movement in the spindle without interfering with the accurate centering of the gage rod. Furthermore, by dividing the major portion of the draw bar 115 into two spaced bars and forming channels within the spindle to receive these bars, maximum compactness of the spindle unit as a whole is attained, the thickness of the various parts being kept at a minimum without sacrificing strength or operative advantages.

The ends of the bars 115$^b$ remote from the chuck are rotatably secured within the hub of a hand wheel 118 which is located outside of the carriage housing, said hub being threaded upon the projecting end of the spindle 27. The connection between the bars 115$^b$ and the wheel 118 in the present instance comprises a pair of collars 119 surrounding the rod 93 and between which the ends of the bars 115$^b$ are secured, a nut 120 holding said collar rotatably within the hub of the hand wheel 118.

When a piece of work "A" is to be placed in or removed from the chuck the hand wheel 118 is manually rotated to cause it to travel along the threads on the spindle 27, and in this traveling movement of the wheel the draw bar 115 as a whole will be moved longitudinally in the direction to release or clamp the jaws of the chuck.

The means herein shown for driving the spindle comprises a pulley 121 which is mounted on the spindle to rotate relative thereto and is driven by a belt 122 running over a pulley forming part of the transmission mechanism 30 between the driving motor 29 and the spindle, as is more fully disclosed in application Ser. No. 619,123 hereinbefore referred to.

A clutch collar 123 is slidably but non-rotatably mounted on the spindle 27 and has cone clutch faces arranged to engage with the complementary faces on the pulley 121 and on a stationary sleeve 124 constituting part of the spindle bearings. The clutch collar is arranged to be shifted by suitable means including a shifter yoke 125 operated by a hand lever 126 (Fig. 1) as is fully described in the above mentioned application. When the clutch collar 123 is in engagement with the pulley 121 the spindle 27 will be driven and when the said collar is moved into engagement with the sleeve 124 braking action will result to promptly stop the spindle. In moving the clutch collar 123 into engagement with the sleeve 124, the yoke 125 engages the collar 105 to move the gage pins from the work "A."

*The grinding wheel carriage.*

The grinding wheel carriage 127 (Figs. 1 and 2) is mounted to reciprocate on suitable ways 127$^a$ (one of which is seen in Fig. 15) running lengthwise of the machine base, the sides of the carriage overhanging the side walls of said base. A spindle 128 has a grinding wheel 129 thereon and is driven by a belt 130 from an electric motor 131 (Fig. 1) mounted upon the underside of the carriage to travel therewith.

This carriage is arranged to be reciprocated by a piston and cylinder unit, one element of which is mounted on the carriage to travel therewith. Preferably the cylinder 132 is fixedly mounted on the underside of the carriage and the piston 133 is stationary and is carried by hollow rods 134 which have their ends mounted in the machine base. The interior of these rods communicate with the cylinder at opposite sides of the piston so that pressure fluid may be introduced into and escape from the cylinder through said rods.

*The operating mechanism.*

The hydraulic pressure fluid, preferably oil, is drawn from the oil reservoir within the machine base by an oil pump 135 (Fig. 2) which is driven by the motor 95, and from this pump the oil is discharged into a main control valve 136, the spent oil flowing from this valve back into the oil reservoir. The said valve is connected to the opposite ends of the hollow piston rods 134 for the grinding wheel carriage by pipes 137 and 138 (Fig. 1), and branch pipes 139 and 140 connect the former pipes with the opposite ends of the hollow piston rods 49 of the headstock carriage feed mechanism.

The construction and mode of operation of this hydraulic operating mechanism including the main control valve 136 is fully disclosed in application Ser. No. 619,122 before referred to and need not be herein described in detail. It is sufficient to say that when the movable member of the valve is in its middle or neutral position, oil which is constantly being circulated by the pump 135 is by-passed through this valve and returned to the oil reservoir in the machine base. When the movable valve member is shifted to the left oil will be delivered to the grinding wheel carriage cylinder 132 to cause the carriage to travel to the left and simultaneously oil will be delivered to the cylinder 46 of the headstock feed mechanism. When the movable valve member is shifted to the right oil will be delivered to the other ends of these cylinders and the grinding wheel carriage will be caused to travel to the right as viewed in Fig. 1. The ratio of these two cylinders and connections is such that the headstock cylinder moves its entire stroke before the grinding wheel cylinder moves. Thus the work is fed at the beginning of each stroke of the grinding wheel, which is an important advantage in obtaining extreme accuracy in grinding.

This movable valve member is connected to an actuator which in the present instance, is in the form of an upright lever 141 (Fig. 1) which is pivoted between its ends at 142 on the machine base. The lower end of the lever is wedge shaped and is arranged to cooperate with a spring pressed plunger 143 having two notches between which is a flat face to coact with a flat face on the end of the wedge on the lever. When these faces are in engagement, the lever and valve 136 are in neutral position. When moved in either direction from this position the plunger 143 tends to move and hold the lever in one extreme position or the other. The lever 141 is arranged to be automatically operated by devices mounted on the carriage 127, the preferred means for effecting this result being arranged as follows:

In the extreme upper end of the lever 141 a spring-pressed detent 144 (Fig. 18) is slidably mounted, the inner end of which is arranged to engage in a cam slot 145ª in a block 145 (Fig. 17) which is adjustably secured to the side wall of the carriage 127. In the present instance the lower edge of this side wall has a T-slot 146 (Fig. 15) therein to receive a bolt 147 by which the block 145 may be secured in place.

The lever 141 also carries near its upper end a pivoted dog 148 which is acted upon by a spring follower 149 to normally maintain the inner end of the said dog in operative position in the path of two dogs 150 and 151 which are adjustably secured to the carriage 127 by bolts engaging in the T-slot 146.

Assuming the carriage 127 to be in the position seen in Fig. 1, when the operator desires to start the machine he pulls outwardly on the detent pin 144 and swings the upper end of the lever 141 to the right thereby shifting the valve 136 to cause the carriage 127 to move to the left. In this movement the beveled end of the dog 150 will push the end of the pivoted dog 148 downwardly out of its way and said dog 148 will snap back into position between dogs 150 and 151. The dog 151 by engagement with the dog 148 will swing the upper end of the lever 141 to the left and shift the valve 136 to reverse the flow of oil to the cylinder 132 and 46 and start the carriage 127 to move to the right. When the dog 150 engages the dog 148 the lever 141 and valve member 136 will again be shifted to reverse the carriage 127. Said carriage thereby reciprocates through a distance depending upon the spacing of the dogs 150, 151, and this spacing corresponds with the length of the bore in the piece of work to be ground so that the grinding wheel 129 will travel from one end of the bore to the other in the reciprocation of the carriage.

Means is provided for automatically tripping the dog 148 on the operating lever when the fine gage enters the bore of the work so as to automatically cause the grinding wheel carriage to move from its grinding position to its idle position and stop. This dog-tripping means in the preferred form herein shown comprises an electromagnet 152 (Fig. 15) mounted in a suitable housing 153 that is secured to the base of the machine. An armature 154 for the magnet is pivoted at 155 and has its upper end attached to a slidable pin 156 which is arranged to engage the dog 148 and swing it out of the path of the dog 150 but not far enough to be out of the path of the dog 151. When the tripping dog 148 is thus tripped, if the grinding wheel carriage 127 be moving toward the headstock carriage, the dog 151 being longer than the dog 150 will still engage the dog 148 to shift the control lever 141, and upon the reversal of said carriage, the dog 148 will miss the dog 150 so that the carriage will continue traveling to its idle position where it will be stopped by engagement of the cam block 145 with the detent 144 on the control lever. When the armature 154 is attracted to its magnet coil a catch 157 drops behind the pin 156 and acts to hold the dog 148 in tripped position until the carriage returns to idle position, at which time a projection 157ª rides up on a cam face 145ᵇ on the block 145 and raises the catch 157 to release the pin 156 and permit the latter to be pushed away by the spring follower 149.

*The electric circuits, etc.*

The electric circuits and connections by which the various motors, magnets, etc., of the machine are operated may be arranged in any suitable or preferred way, so as to effect the results described, one exemplary arrangement being illustrated in Fig. 3, wherein the various parts are shown in a skeleton or diagrammatic way.

The main line terminals are designated 158 and 159 one of which is connected to a group of three interconnecting terminals 160 and the other of which is connected through a rheostat 161 to a similar interconnecting group of terminals 162. From these two groups of terminals pairs of wires 163, 164 and 165 run respectively to the motors 29, 95 and 131 which drive the headstock spindle, the coolant and oil pumps, and the grinding-wheel spindle respectively. The first point of the resistance coils on the rheostat 161 is also connected by wires 166 to these three motors. The rheostat solenoid 167 is connected across the main lines in a circuit 168 which includes a line switch 169 in the rheostat box and a push button or other manual snap switch 170 located at a point on the machine in convenient reach of the operator. By means of these switches the supply of current to all three of the motors is controlled.

Of the two pairs of contact pins 107 of the gage rod switch mechanism, one pair is connected to the terminals 160, 162, by wires 171 through the magnet 66 for the coarse feed pawl. The other pair of contacts 107 is similarly connected by a pair of wires 172 in a circuit which includes the magnet 67 for the fine feed pawl and the magnet 152 for tripping the dog 148 on the main control lever 141. These two circuits 171, 172, will be closed so as to energize their magnets when the pairs of contacts 107 are bridged upon the entry of the respective gages 90, 91, into the bore of the work as already explained.

*Brief résumé of operation.*

Assuming the switches 169, 170, to be closed so that all three motors 29, 95 and 131 are running, the operation is as follows: The operator fastens a piece of work "A" in the chuck 28, swings the hand lever 126 to shift the clutch collar 123 to engage the chuck spindle with its drive pulley; manually adjusts the position of the headstock carriage, if necessary, by means of the hand wheel 65 to permit entry of the grinding wheel into the bore of the work; and then pulls out the spring detent 144 on the control lever 141 and swings the upper end of said lever to the right. This causes pressure fluid to be forced into cylinders 46 and 132 to move the grinding wheel carriage 127 toward the headstock carriage until the grinding wheel 129 enters the work whereupon the carriage automatically begins to reciprocate under the control of the fixed dogs 150 and 151 thereon. The operator may now manually adjust the headstock carriage if necessary to carry the piece of work into contact with the grinding wheel, after which he pushes in on the plunger 89 to release the feed pawls 35 and 36 into engagement with the ratchet wheel 34 thereby starting the power feed. The machine then proceeds automatically to grind the bore of the work, and as the successive gages 90, 91 enter the bore the feed is automatically changed from coarse to fine and is finally stopped, at which time the trip dog 148 on the control lever 141 is operated by the magnet 152 to cause the grinding wheel carriage to move from its grinding to its idle position and stop. The operator now swings the hand lever 126 to move the clutch collar 123 against its brake sleeve 124 and stop the work spindle 27. He then replaces a piece of work and the cycle just described is repeated.

It is desirable that the feeding movement of the headstock carriage take place at one end of the stroke of the grinding wheel carriage. The cylinders 46 and 132 are of unequal size, the length of the stroke of the cylinder 132 being many times that of the cylinder 46, and the internal diameter of the cylinder 132 also being considerably greater than that of the cylinder 46. Furthermore, the load to be moved or work done by the cylinder 46 is much less than that of the cylinder 132. For these reasons, at each reversal of the control valve 136, the cylinder 46 will quickly make its complete stroke at the very beginning of the movement of the cylinder 132. This results in complete feeding movement being imparted to the work while the grinding wheel is at one end of is stroke.

We claim as our invention:

1. A grinding machine having, in combination, a base, two spindle carriages mounted to move in horizontal planes at an angle to each other, means for feeding one of said carriages, hydraulic mechanism for actuating said feeding means and for reciprocating the other carriage, a gage arranged to enter the bore of the work which is mounted on one carriage, and means automatically operable upon such entry of the gage to stop said feeding means and cause said hydraulic mechanism to move said other carriage from its grinding to an idle position.

2. A grinding machine having, in combination, a carriage having a horizontal spindle provided with a work holder, a second carriage having a horizontal spindle carrying a grinding wheel, means for effecting a horizontal transverse feeding movement between said work spindle carriage and said grinding wheel carriage, hydraulic mechanism for horizontally moving said grinding spindle carriage from an idle position remote from the work spindle carriage to a grinding position and for automatically reciprocating said carriage in its grinding position, gaging means coacting with the piece of work being ground, and mechanism which is automatically operated by said gaging means when the work reaches a predetermined size arranged to stop said feeding means and cause said hydraulic mechanism to move said grinding wheel carriage from its grinding position to its idle position.

3. A grinding machine having, in combination, two carriages mounted for horizontal movement at right angles to each other, said carriages having spindles provided with a work holder and a grinding wheel respectively, means including a pawl and ratchet for feeding one carriage transversely to its spindle axis, means for reciprocating the other carriage longitudinally of its spindle axis, a gage arranged to coact with the work, an electric switch operated by said gage, means including an electromagnet for withdrawing said pawl from its ratchet, a controller for said carriage-reciprocating means having a movable dog thereon, two dogs adjustably fixed on said reciprocatory carriage and arranged to engage said movable dog and reverse said controller, means including an electromagnet for withdrawing said movable dog, means for holding said movable dog in withdrawn position, means positioned to engage said last mentioned means to release said movable dog, and an electric circuit governed by said switch and including both of said electromagnets.

4. A grinding machine having, in combination, a carriage having a work holder, a gage coacting in said holder, a spindle carriage having a grinding wheel, a feed screw for moving said first mentioned carriage transversely of said grinding wheel, a ratchet on said feed screw, a double arm lever loosely mounted on said feed screw next to said ratchet, a feed pawl carried by each arm of said lever and adapted normally to engage said ratchet, each pawl having a roller stud, means for oscillating said lever, and a pair of electromagnets carrying tracks to engage said roller studs, said electromagnets being operable successively by said gage to lift and hold said feed pawls out of engagement with said ratchet wheel.

5. A machine tool having in combination, a carriage, power means for reciprocating said carriage, a controller for said power means, a spring pressed dog on said controller, two fixed dogs on said carriage arranged to engage said spring pressed dog to reciprocate said controller, one of said fixed dogs being shorter than the other to deflect and pass said spring pressed dog as said carriage moves initially in one direction, means for withdrawing said spring pressed dog beyond the reach of said short fixed dog to discontinue reciprocation of said carriage, means for holding said spring pressed dog in withdrawn position, and means on said carriage for engaging said last mentioned means as said carriage moves in the other direction to release said spring pressed dog.

6. A grinding machine having, in combination, a carriage having a work holder, a gage coacting with the work in said holder, means including a ratchet device having two pawls for feeding said carriage, a pair of electromagnets having pivoted armatures, means operated by said armatures for moving said pawls out of operative position, two devices arranged to independently lock said armatures in position with the pawls inoperative, a single manually operable means for releasing both said locking devices to permit the return of the pawls to operative position, and means controlled by said gage for governing the action of said electromagnets.

7. A horizontal grinding machine having, in combination, a work holder, a gage arranged to coact with the work in said holder, a reciprocating carriage having a grinding wheel to operate on said work, means for effecting a relative transverse feed between said work holder and said grinding wheel, hydraulic means for moving said reciprocatory carriage from its remote inoperative position into its operative position automatically reciprocating said carriage in said last mentioned position until the work has been ground to a predetermined point, and automatically returning said reciprocatory carriage to its remote inoperative position, said gage acting to institute said returning movement, and means for automatically stopping said carriage in said inoperative position.

8. A grinding machine having, in combination, a carriage, power means for reciprocating said carriage, a controller for said power means, a spring pressed dog on said controller, two fixed dogs on said carriage arranged to engage said spring pressed dog to oscillate said controller, means including an electromagnet for moving said spring pressed dog beyond the reach of said fixed dogs to discontinue reciprocation of said carriage, and a stop on said carriage positioned to engage said controller and move it into its neutral inoperative position as said carriage moves into its inoperative position.

9. A grinding machine having, in combination, a work holder, a gage arranged to automatically and periodically coact with the work in said holder, a reciprocatory carriage having a grinding wheel to operate on the work, a piston and cylinder for moving said carriage, means including a control valve for supplying pressure fluid to said cylinder, an actuator for said valve, cooperating parts on said carriage and said actuator for operating said actuator, and means controlled by said gage and arranged to govern the relation of said cooperating parts and thereby control the movements of said carriage.

10. A horizontal grinding machine having, in combination, a work holder, a gage arranged to coact with the work in said holder, a grinding wheel, means for imparting a relative feed between the work holder and the grinding wheel comprising a pawl and ratchet, power means for operating said pawl, an electromagnet having an armature and associated means arranged to move said pawl out of engagment with said ratchet, a dog arranged to lock said armature with the pawl held out, means for manually operating said feeding means while said pawl is held out, and manual means for releasing said dog to permit the return of the pawl to its ratchet.

11. A machine tool having, in combination, a carriage, power means for reciprocating said carriage, a controller for said power means, a movable dog on said controller, two fixed dogs on said carriage arranged to engage said movable dog and thereby operate said controller, an electromagnet, means operated by said electromagnet for withdrawing said movable dog, means for holding said movable dog in withdrawn position when said electromagnet is deenergized, and means for automatically releasing said dog.

12. A grinding machine having, in combination, a carriage, a feed screw therefor, a ratchet wheel for rotating said feed screw, two power driven pawls engaging said ratchet wheel, two arcuate shields each underlying one of said pawls and controlling the degree of engagement of the pawls with the ratchet wheel, two concentric sleeves mounted on the feed screw shaft, each having at one end a radial arm carrying one of said shields at its free end, and two radial indicator arms fixed on the opposite end of said sleeves.

13. A grinding machine having, in combination, a carriage having a hollow spindle provided with a work holder, a rod slidable axially through said spindle and carrying a gage to contact with the work in said holder, a second carriage having a grinding wheel to operate on the work, means for reciprocating one of said carriages in relation to the other, and means operable by a part on the second carriage and connected to said gage rod at a point remote from the gage thereon for reciprocating said gage.

14. A grinding machine having, in combination, a carriage having a hollow spindle provided with a work holder, a rod slidable axially through said spindle and carrying a gage to contact with the work in said holder, a second carriage having a spindle and grinding wheel thereon, means for reciprocating one of said carriages with relation to the other, and means for moving said gage comprising two coacting parts located respectively on the two carriages at points remote from their spindles.

15. A grinding machine having, in combination, a tubular rotary spindle having a work holder thereon, a slidable gage rod extending axially through said spindle and having a gage to contact with a piece of work in said holder, a reciprocatory carriage having a grinding wheel thereon, and means operated by the latter carriage for reciprocating said gage rod, including a rod slidably mounted in the first mentioned carriage outside of said spindle and parallel thereto, the ends of said rod and the gage rod remote from said work holder being connected together so that the two rods slide in unison.

16. A grinding machine having, in combination, a slidable carriage having a tubular spindle mounted therein, a work holder mounted on said spindle, a gage rod slidable axially through said spindle and having a gage to coact with the work in said holder, a rod slidably mounted in said carriage parallel to said gage rod, a bracket rigidly connecting together the ends of said rods remote from said work holder so that said two rods will slide in unison, a reciprocatory grinding wheel carriage having a grinding wheel to engage the work in said holder and having a part to abut against the second mentioned rod and thereby move the gage rod away from the piece of work, a spring for moving the gage rod in the opposite direction, and means controlled by the movements of said gage rod for feeding the first mentioned carriage transversely to the axis of its spindle.

17. A grinding machine having, in combination, a hollow spindle, a work holder mounted on said spindle, a gage to coact with the work on said holder, and means within said spindle for operating said work holder, for supporting said gage and for conducting a coolant.

18. A grinding machine having, in combination, a hollow spindle, a work holder mounted on said spindle, a gage to coact with the work on said holder, means within said spindle for operating said work holder, and means within said spindle for supporting said gage, said two means being independently reciprocable in said spindle.

19. A grinding machine having, in combination, a carriage having a hollow spindle provided with a work holder, a rod slidable axially through said spindle and carrying a work gage, means mounted on said carriage in a position remote from said gage for operating said gage, a second carriage having a grinding wheel and having a part arranged to actuate said gage-operating means, and means for reciprocating one of said carriages with relation to the other.

20. A grinding machine having, in combination, a carriage having a spindle provided with a work holder, a gage mounted coaxially with said spindle, a second carriage having a grinding wheel to operate on the work in said work holder, and means mounted in a position removed from said work holder, gage and grinding wheel and connected to said gage for moving the latter.

21. A grinding machine having, in combination, a hollow spindle having longitudinal guide channels in its interior, and having a work chuck mounted on one end, an actuator for said work chuck comprising a sleeve portion at one end mounted in the end of the spindle and attached to one of the chuck elements, and spaced bars extending from said sleeve portion and slidably fitting in said guide channels in the spindle, means at the end of the spindle opposite to said chuck engaging said bars for sliding said actuator as a whole in relation to said spindle and thereby operating said chuck, bushings fitting in said spindle between said spaced bars, and a tube fitting in said bushings and longitudinally reciprocable with relation to said spindle independently of said chuck actuator, said tube carrying at one end a gage to coact with the work in said chuck, and the tube also serving as a conduit for a coolant to play on the work.

22. A grinding machine having, in combination, a hollow spindle having a work chuck mounted on one end and having a longitudinal internal guideway, an actuator for said chuck slidable in said guideway, means at the end of said spindle opposite said chuck engaging said actuator for sliding the latter in relation to the spindle to operate the chuck, a rod passing axially through said spindle and carrying at one end a gage to coact with the work in said chuck, and means for exactly centering said rod in said spindle and allowing independent reciprocation of the rod and of said chuck actuator in relation to the spindle.

23. A grinding machine having, in combination, a hollow spindle having a work chuck mounted on one end and having longitudinal internal guide channels, an actuator for said chuck comprising spaced bars slidable in said channels, means at the end of said spindle opposite said chuck engaging said bars for sliding the latter in relation to the spindle to operate the chuck, a rod passing axially through said spindle and carrying at one end a gage to coact with the work in said chuck, means for exactly centering said rod in said spindle and allowing independent reciprocation of the rod and of said chuck actuator in relation to the spindle, and means attached to the end of said rod remote from said gage for reciprocating said gage.

24. A grinding machine having, in combination, a spindle provided with a work holder, a tube passing through said spindle, a fitting mounted on the end of said tube adjacent said work holder and having a passage therethrough, and a gage secured to said tube by said fitting, said tube and fitting providing a conduit for a coolant.

25. A grinding machine having, in combination, a hollow spindle provided with a work holder at one end, a tube passing through said spindle, and a gage mounted on the end of said tube adjacent to said work holder, said tube serving the dual purpose of a gage support and a conduit for coolant.

26. A grinding machine having, in combination, a carriage having a hollow spindle provided with a work holder, a tube slidable axially through said spindle, a gage mounted on the end of said tube adjacent to said work holder and arranged to coact with the work, a coolant pump, and means including a flexible conduit connecting said pump to the end of said tube remote from said gage, said tube serving the dual purpose of a gage support and a coolant conductor, and means for reciprocating said tube and gage.

27. A grinding machine having, in combination, a carriage having a hollow spindle provided with a work holder at one end, a tube slidable axially through said spindle, a gage carried by said tube and arranged to coact with the work in said holder, a source of coolant supply under pressure, means including a flexible conduit connecting said source to the end of said tube remote from said gage, said tube serving the dual purpose of a gage support and a coolant conductor, a second reciprocatory carriage having a grinding wheel to operate on the work in said holder, and means operating in synchronism with the reciprocations of said second carriage for reciprocating said tube.

28. A grinding machine having, in combination, a rotary spindle, provided with a clutch and a work holder, a plurality of gages mounted concentrically one in the rear of the other for controlling the grinding operation, and means automatically operable by the release of said clutch for rendering said gages inoperative.

29. A grinding machine having, in combination, a rotary spindle provided with a work holder, a gage mounted to periodically engage the work in said holder for controlling the grinding operation, and means automatically operable by stopping said spindle for holding said gage out of engagement with the work.

30. A grinding machine having, in combination, a carriage having a hollow spindle provided with a work holder, a rod slidable axially through said spindle and carrying a gage to contact with the work in said holder, a second carriage having a grinding wheel to operate on the work, means for reciprocating one of said carriages in relation to the other, and means operable when said spindle is inoperable for holding said gage out of engagement with the work.

31. A grinding machine having, in combination, a rotatable spindle provided with a clutch and a work holder, a rod slidable through said spindle and carrying a gage to contact with the work in said holder, and means connecting said clutch with said rod for moving said gage away from the work when said clutch is thrown to stop rotation of said spindle.

32. A grinding machine having, in combination, a work holder, a gage arranged to coact with the work in said holder, a reciprocating carriage having an operating and an idle position and having a grinding wheel to operate on said work, means for effecting a relative transverse feed between said work holder and said grinding wheel, hydraulic means for moving said carriage, reversing means associated with said hydraulic means and serving to effect a reciprocation of said carriage in said operating position, said reversing means including a valve, a valve actuator, and a set of coacting dogs on said carriage and said actuator, one of said dogs being movable into and out of operative position, means under the control of said gage for moving said movable dog into inoperative position to discontinue said reciprocation and to permit movement of said carriage into inoperative position, and means for stopping said carriage in inoperative position.

In testimony whereof we have hereunto affixed our signatures.

PRENTICE CONRADSON.
HERBERT E. KEMPTON.
KEITH F. GALLIMORE.